US007358641B2

(12) United States Patent
Kume

(10) Patent No.: US 7,358,641 B2
(45) Date of Patent: Apr. 15, 2008

(54) BRUSH DEVICE FOR ROTARY ELECTRIC MACHINE

(75) Inventor: Harumi Kume, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/651,556

(22) Filed: Jan. 10, 2007

(65) Prior Publication Data

US 2007/0182272 A1 Aug. 9, 2007

(30) Foreign Application Priority Data

Feb. 8, 2006 (JP) ............................ 2006-031281

(51) Int. Cl.
*H02K 13/00* (2006.01)

(52) U.S. Cl. ...................................... 310/245; 310/248

(58) Field of Classification Search ......... 310/239–248
See application file for complete search history.

(56) References Cited

U.S. PATENT DOCUMENTS 1,757,611 A * 5/1930 Binney ....................... 310/242
2,870,353 A * 1/1959 Shobert, II .................. 310/228
3,353,047 A * 11/1967 Buchwald .................... 310/247
4,354,128 A * 10/1982 Chew et al. ................ 310/242
4,959,576 A 9/1990 Horibe et al.
5,414,319 A * 5/1995 Nowicki et al. ............ 310/248

FOREIGN PATENT DOCUMENTS

JP B2 7-32571 4/1995
JP A 2003-134745 5/2003

* cited by examiner

*Primary Examiner*—Dang Le
(74) *Attorney, Agent, or Firm*—Oliff & Berridge, PLC

(57) ABSTRACT

A brush device assembled in a vehicular alternator is composed mainly of a pair of brushes, a pair of springs, and a brush holder. The brush holder accommodates the brushes and the springs. The springs push the brushes toward slip rings placed on and fixed to a rotary shaft of a rotor. A slant-line mark is drawn on a surface of the brush by paint. The direction of this mark is slanted to, not perpendicular to and not parallel to, the direction of pushing the brush toward the rotary shaft of the rotor. According to the proceeding of wear of the brush, the slant-line mark on the surface of the brush faced and contacted to the slip ring is shifted toward the right direction. An observer observes the position of the slant-line mark and recognizes the proceeding of wear and the optimum time to replace the brush with a new brush.

13 Claims, 6 Drawing Sheets

BRUSH DEVICE FOR ROTARY ELECTRIC MACHINE

CROSS-REFERENCE TO RELATED APPLICATIONS

This application is related to and claims priority from Japanese Patent Application No. 2006-31281 filed on Feb. 8, 2006, the contents of which are hereby incorporated by reference.

BACKGROUND OF THE INVENTION

1. Field of the Invention

The present invention relates to a brush device for an electric rotary machine such as a vehicular alternator.

2. Description of the Related Art

The brush device mounted on a vehicular alternator is mainly composed of brushes, brush copper wires, springs, and a brush holder. The brush holder is equipped with terminals made of metal and accommodates the brushes, the brush copper wires, and the springs therein. The brush copper wires are fixed to and electrically connected to the brushes by caulking and the like. The springs forcedly push the brushes toward slip rings that are mounted on a rotor shaft of a rotor. In the brush device, the brush copper wires are electrically connected to the terminals. U.S. Pat. No. 4,959,576 (corresponding to Japanese patent No. JP H7-32571) has disclosed such a brush device, for example.

Because the rotation of the rotor of the vehicular alternator causes wearing a contact part of each brush that contacts the surface of the corresponding slip ring, it is necessary to replace the worn brush with a new brush before reaching the lifetime of the worn brush. For example, it is necessary to dismantle or disassemble the vehicular alternator at a periodic inspection time in order to estimate the length of the worn part of each brush by measuring the magnitude of a spring force applied to the surface of the brush. However, because such a conventional manner requires dismantling or disassembling the brush device from the vehicular alternator, it takes a long inspection working time.

In order to avoid such a conventional drawback, namely to reduce the inspection working time, another conventional technique provides a brush device equipped with a brush having a concave part. The configuration of this brush device, an inspector can recognize a replacement time of the brush without dismantling the brush device from the vehicular alternator, namely without disassembling the vehicular alternator. Japanese patent laid open publication No. JP 2003-134745 has disclosed such a conventional technique. The concave part formed on the brush is hidden while the brush is not worn. In other words, because the concave part formed on the brush is not exposed on the surface thereof before a replacement time of the brush, the inspector can not observe the concave part from the outside of the vehicular alternator unless the brush device is dismantled. When the brush is worn off, the inspector can observe the concave part of the brush exposed to the outside for the first time, for example, he detects the exposed concave part at a following replacement time. According to the result of the inspection, the worn brush is replaced with a new brush.

In this conventional technique, the inspector can know the replacement time to replace the worn brush with new one by detecting the concave part exposed on the surface of the brush. Thus, this conventional technique only shows whether the concave part is exposed or not, that is, the inspector cannot know the detailed wear-condition of the brush in use. For example, if an abnormal wear-condition of the brush occurs by some reasons, which are advanced faster than a normal use, the inspector cannot recognize the occurrence of the abnormal wear-condition unless the concave part of the brush is exposed to the outside.

In addition, because there is a possibility of exposing the concave part on the brush immediately following the periodic inspection time, it is necessary to form the concave part at the optimum position in order to continuously use the brush for a short period of time after the exposure of the concave part on the brush. However, there is a possibility of replacing a worn brush with a new one if the position of the concave part is separated from the optimum position. This case is not economical. On the contrary, even if the position of the concave part is formed at a position almost equal to a optimal serviceability limit position, there still remains a possibility of occurring the break of the brush before the following inspection time. This introduces difficulty in continuous use of the brush in safe. In particular, because the travel distance fluctuates from vehicle to vehicle even if the periodic inspection is carried out at a regular period of time, it is in general difficult to satisfy both the economy and safety simultaneously through all vehicles, in view of wear of the brush in the brush device, for example.

SUMMARY OF THE INVENTION

It is an object of the present invention to provide an improved brush device for an electric rotary machine such as a vehicular alternator, capable of easily inspecting a detailed use-condition of brushes in the brush device at any time.

Another object of the present invention is to provide an improved brush device for an electric rotary electric machine such as a vehicular alternator, capable of simultaneously satisfying both economy and safety in view of a wear state of a brush in the brush device.

To achieve the above purposes, the present invention provides a brush device for an electric rotary machine. The brush device is composed mainly of a brush, a spring, and a brush holder. In the brush device, the brush is forcedly pushed to a surface of a slip ring which is mounted on a rotary shaft of a rotor in the vehicular alternator. The spring forcedly pushes the brush toward the slip ring of the rotor. The brush holder accommodates the brush and the spring. In the brush device, a mark formed on a surface of the brush is slanted to the axis of the rotary shaft. The surface of the brush is perpendicular to the rotary shaft of the rotor.

As a concrete example, a preferable direction of the mark is not parallel to and not perpendicular to the direction toward which the spring forcedly pushes the brush that is electrically and physically contacted to the slip ring. The slip ring is placed on the rotary shaft of the rotor. Because the relative position of the mark to the slip ring is changed according to the progress of the brush wear, an inspector can recognize a detailed used-state (or, a wear-state) of the brush. Further, it is possible to reduce the manufacturing cost of the brush device as low as possible because the mark is only formed on the surface of the brush. Further, because the inspector easily recognizes the wear-state of the brush before the vehicular alternator equipped with the brush device is fallen in an inoperable state, it is possible to satisfy both the economy and safety of the electric rotary machine equipped with the brush device in view of the wear-state of the brush.

Further, it is preferred that the mark is formed on at least one surface of the brush so that an inspector recognizes the mark without releasing the force of the spring of pushing the brush toward the slip ring, namely, while keeping the pushing force to the brush by the spring. It is thereby possible for the inspector to recognize the detailed use-state (or the detailed wear-state) of the brush in the assembled state without dismantling or disassembling the brush from the vehicular device.

Still further, the electric rotary machine equipped with the brush device described above has a rear cover that covers electric components. The mark is visually formed on the surface of the brush from the outside of the electric rotary machine by the inspector when the rear cover is dismantled from the electric rotary machine. It is thereby possible for the inspector to recognize the use-state or the wear-state of the brush only by dismantling the rear cover from the electric rotary machine.

Furthermore, the rotary electric machine equipped with the brush device described above further has a sealing member placed between the brush holder and the rear cover, In the rotary electric machine, the sealing member has a penetrating hole formed at a position opposite to another surface faced to the rotary shaft of the rotor when the sealing member is assembled into the brush holder. The presence of the sealing member can maintain an airtight state around the slip ring during the operation of the rotary electric machine, and it is possible for the inspector to easily recognize the use-state of or wear-state of the brush under the assembled sealing member at a periodic inspection only by dismantling the rear cover from the vehicular alternator.

Still further, it is preferred to draw the mark on the surface of the brush by paint. This can be easily achieved only by drawing or adding the mark on the surface of the brush and also can get the function of inspecting the use-state or wear-state of the brush without changing the shape of the brush with the minimum design change in the manufacturing.

Further, it is also preferred that the mark is at least one of a concave part and a convex part formed on the surface of the brush, instead of the mark drawn on the surface of the brush described above. It is thereby for the inspector possible to make the mark only by changing a mold shape of the brush, and possible to add the function of inspecting the use-state or wear-state of the brush without increasing the number of component parts and steps in the manufacturing of the brush device.

Still further, it is preferred that the brush holder has scale marks formed on a surface of the brush holder faced to the surface of the brush on which the mark is formed. It is thereby possible to easily recognize the change of the position of the mark formed on the surface of the brush by observing the presence of the scale marks corresponding to the wear-state of the brush. Thereby, the inspector can recognize the use-state or wear-state of the brush through the scale marks accuracy and certainly.

Still further, it is preferred that an arrangement or shape of the scale marks indicates a serviceability limit time of the brush. Thereby, the inspector can easily recognize the use-state or wear-state of the brush through the mark and the scale marks relating to its serviceability limit.

Moreover, it is preferred that the arrangement or shape of the scale marks indicates one of a replacement time and a serviceability limit time of the brush. Thereby, the inspector can easily recognize the use-state or ware-state of the brush through the mark and the scale marks relating to its serviceability limit and its replacement time.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
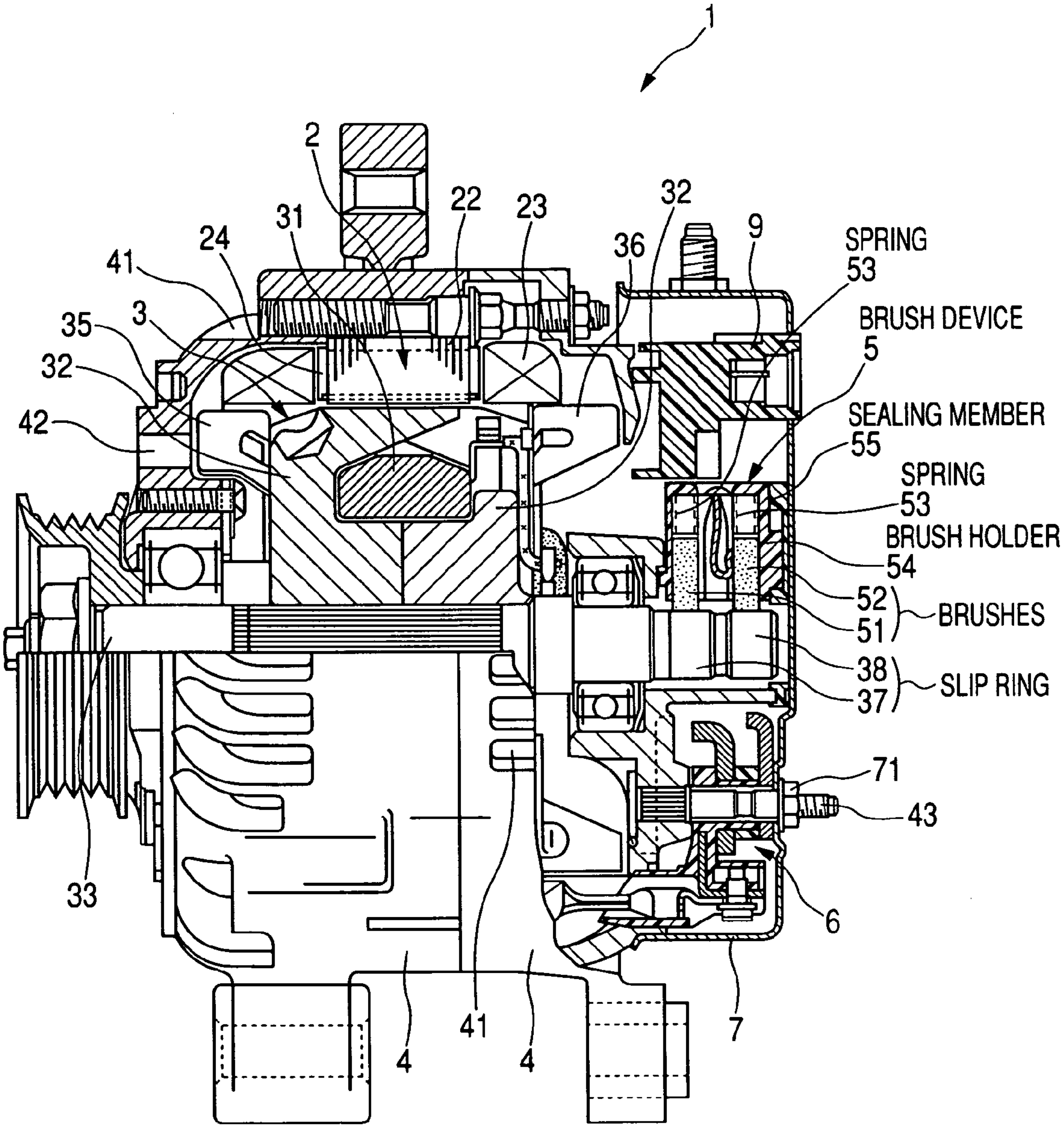
FIG. 1 is a sectional view showing an entire configuration of a vehicular alternator as an electric rotary machine of an embodiment according to the present invention.

Hereinafter, various embodiments of the present invention will be described with reference to the accompanying drawings. In the following description of the various embodiments, like reference characters or numerals designate like or equivalent component parts throughout the several diagrams.

EMBODIMENT

A description will be given of a vehicular alternator as an electric rotary machine to be mounted on a vehicle with reference to FIG. 1 to FIG. 6.

FIG. 1 is a sectional view showing an entire configuration of the vehicular alternator 1 as an electric rotary machine, to be mounted on a vehicle, according to an embodiment of the present invention.

The vehicular alternator 1 is composed mainly of a stator 2, a rotor 3, a frame 4, a brush device 5, a rectifier device 6, a rear cover 7, and the like.

The stator 2 is equipped with a stator core 22, three-phase stator windings 23, a stator core 22, and an insulator 24 electrically insulating the stator core 22 from the stator wirings 23. The rotor 23 is composed mainly of a pair of pole cores 32, field windings 31, and a rotary shaft 33. Each pole core 32 has a six claw poles. The field windings 31 are made of insulated copper wires that are wound in a concentric configuration and a cylindrical shape. Through the rotary shaft 33, a pair of the pole cores 32 accommodates the field windings 31. Cooling fans 35 are attached and fixed by welding to the end surface of the pole core 32 placed at the front side. The cooling fans 32 suck cooling air from the front side of the vehicular alternator 1 and blow, namely send the cooling air toward the axis direction of the rotary shaft 33 and the radius direction of the vehicular alternator 1.

Similarly, cooling fans 36 are mounted on and fixed by welding to the end surface of the pole core 32 placed at the rear side. The cooling fans 36 suck cooling air from the rear side of the vehicular alternator 1 and blow the cooling air, namely sends the cooling air toward the radius direction of the vehicular alternator 1.

At the rear side of the rotary shaft 33, a pair of slip rings 37 and 38 are mounted on and fixed to the rotary shaft 33. An electric power is supplied from the brush device 5 to the field windings 31 through the slip rings 37 and 38.

The frame 4 accommodates the stator 2 and the rotor 3. The rotor 3 is rotatably supported by the frame 4 around the rotary shaft 33. Further, the stator 2 is placed and fixed to the frame 4 at the position separated in a specified interval from the outer periphery side of the pole cores 32 of the rotor 3. The frame 4 has an outlet window 41 and an inlet window 42 for the cooling air. The outlet window 41 is placed at a part opposed to the stator windings 23 extruded from the end surface of the stator core 22 in the axis direction of the stator core 22. The inlet window 42 is placed at the end surface of the stator core 22 in the axis direction of the stator core 22.

The brush device 5 is capable of supplying the exciting current from the rectifier device 6 to the field windings 31 of the rotor 3. The brush device 5 is composed mainly of brushes 51 and 52, springs 53, a brush holder 54, and a sealing member 55. The brushes 51 and 53 are pushed toward the slip rings 37 and 38 mounted on and fixed to the rotary shaft 33 of the rotor 3. That is, the springs 51 and 52 push the brushes 51 and 52 toward the slip rings 37 and 38. The brush holder 54 accommodates the brushes 51 and 52 and the springs 53. The sealing member 55 is placed between the brush holder 54 and the rear cover 7.

The rectifier device 6 rectifies a three-phase AC (alternating current) voltage as an output voltage of the stator windings 23 of three-phases and outputs a DC (direct current) voltage. The rear cover 7 accommodates and protects electrical components such as the brush device 5 mounted on the outer side of the rear frame 4, the rectifier device 6, and an IC regulator 9. The rear cover 7 is fixed to the rear frame 4 through the rectifier device 6 by bolts 43 extended from the rear frame 7.

Next, a description will now be given of the detailed configuration and features of the brush device 5 mounted on the vehicular alternator 1 of the embodiment according to the present invention.

Figure 2:
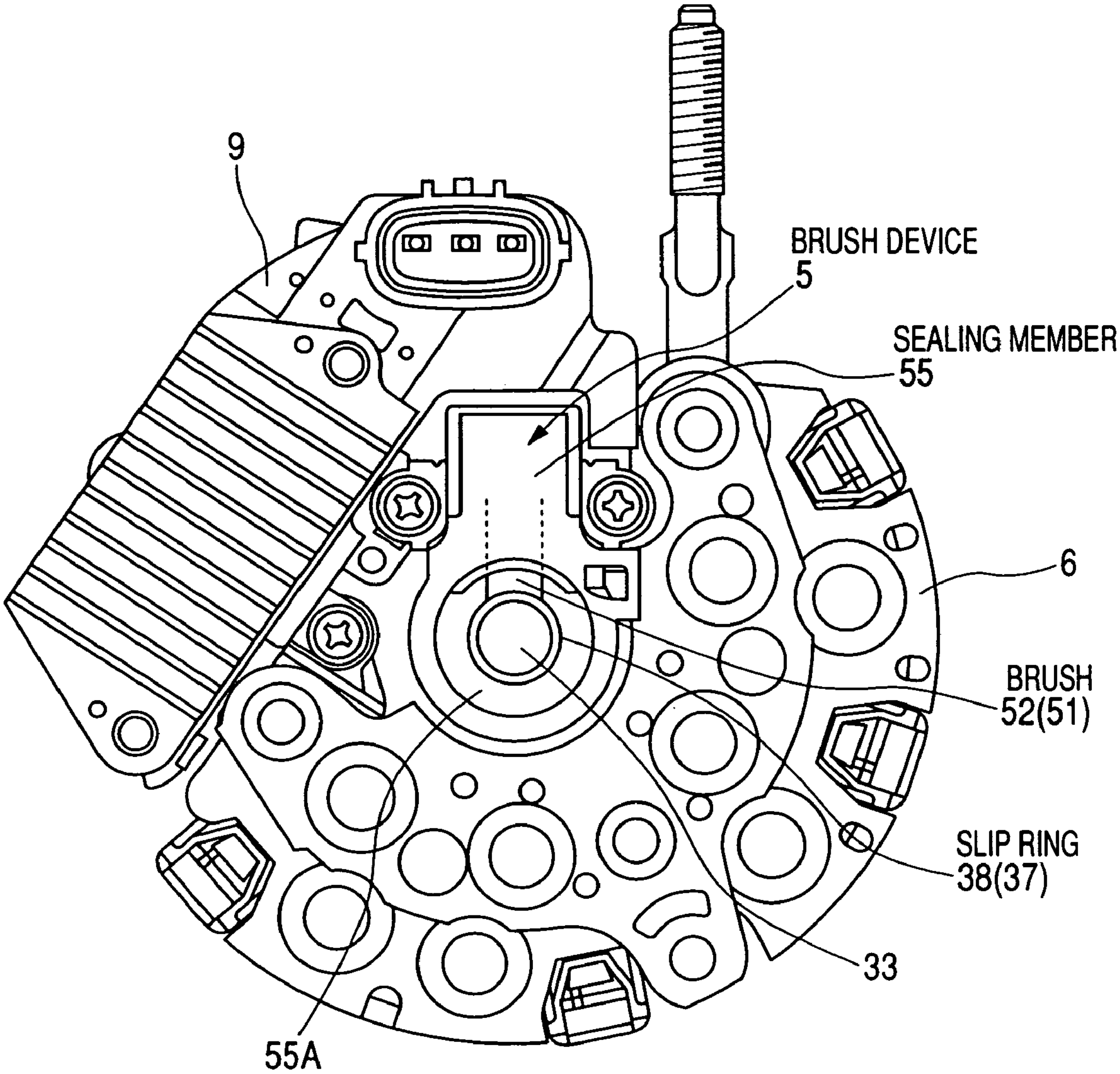
FIG. 2 is a view showing a brush device assembled into a rectifier device of the vehicular alternator of the embodiment shown in FIG. 1.

FIG. 2 is a view showing the brush device 5 assembled into the rectifier device 6 mounted on the vehicular alternator 1 shown in FIG. 1 according to the embodiment.

As shown in FIG. 2, the brush device 5 is assembled near the rotary shaft 33 of the rotor 3 while the springs 53 push the brushes 51 and 52 toward the direction of the slip rings 37 and 38.

The sealing member 55 placed at the side of the rear cover 7 has a penetrating hole 55A. Through the penetrating hole 55A, an inspector can recognize the surface-state or wear-state of the brushes 52 that are pushed toward the direction of the slip rings 38 at the rear side in the assembled state of the brush device 5 into the brush holder 54 when the rear cover 7 is dismantled from the frame 4.

Figure 3:
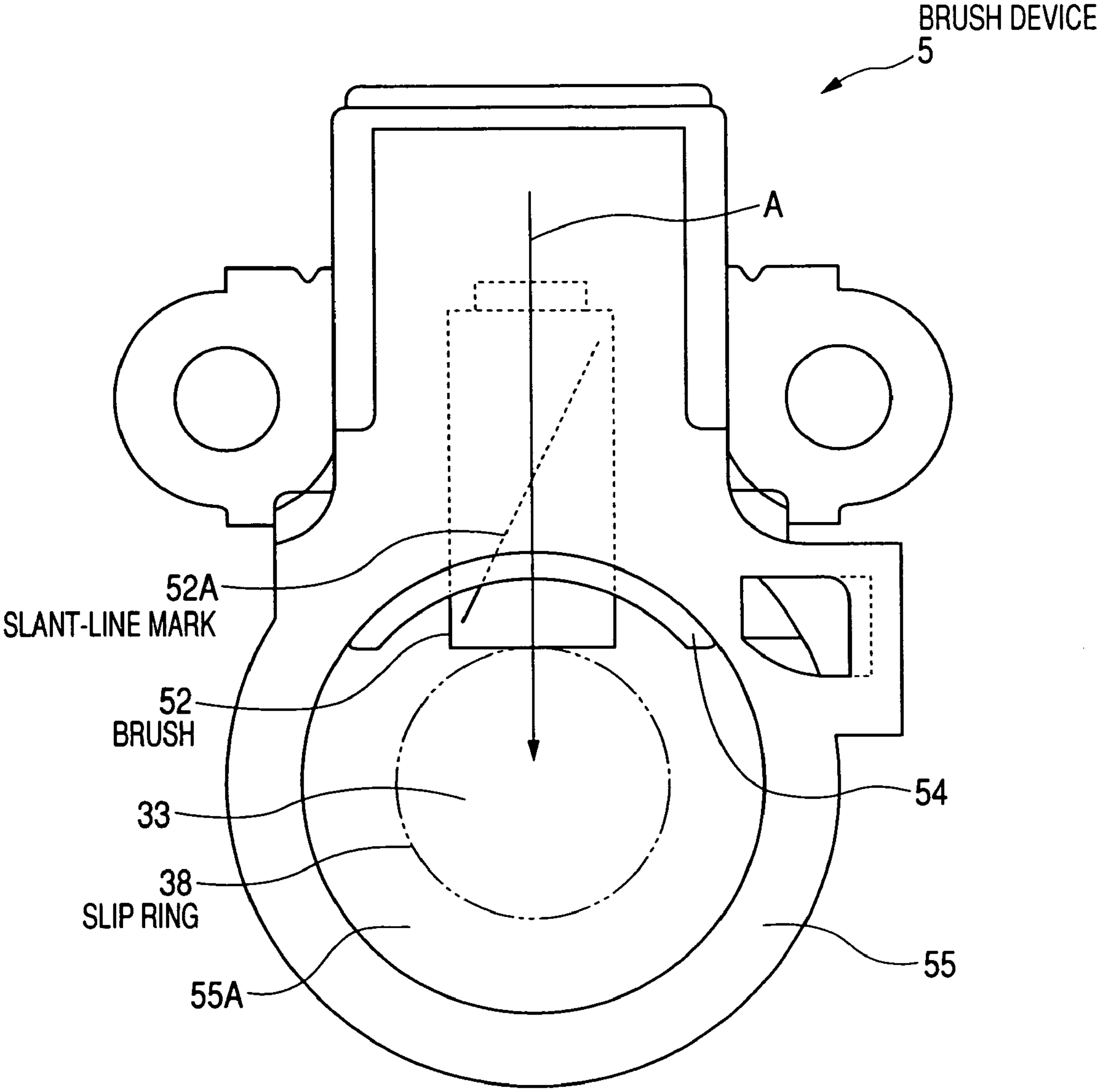
FIG. 3 is a plan view of the brush device having a new brush according to the embodiment shown in FIG. 1 and FIG. 2.
Figure 4:
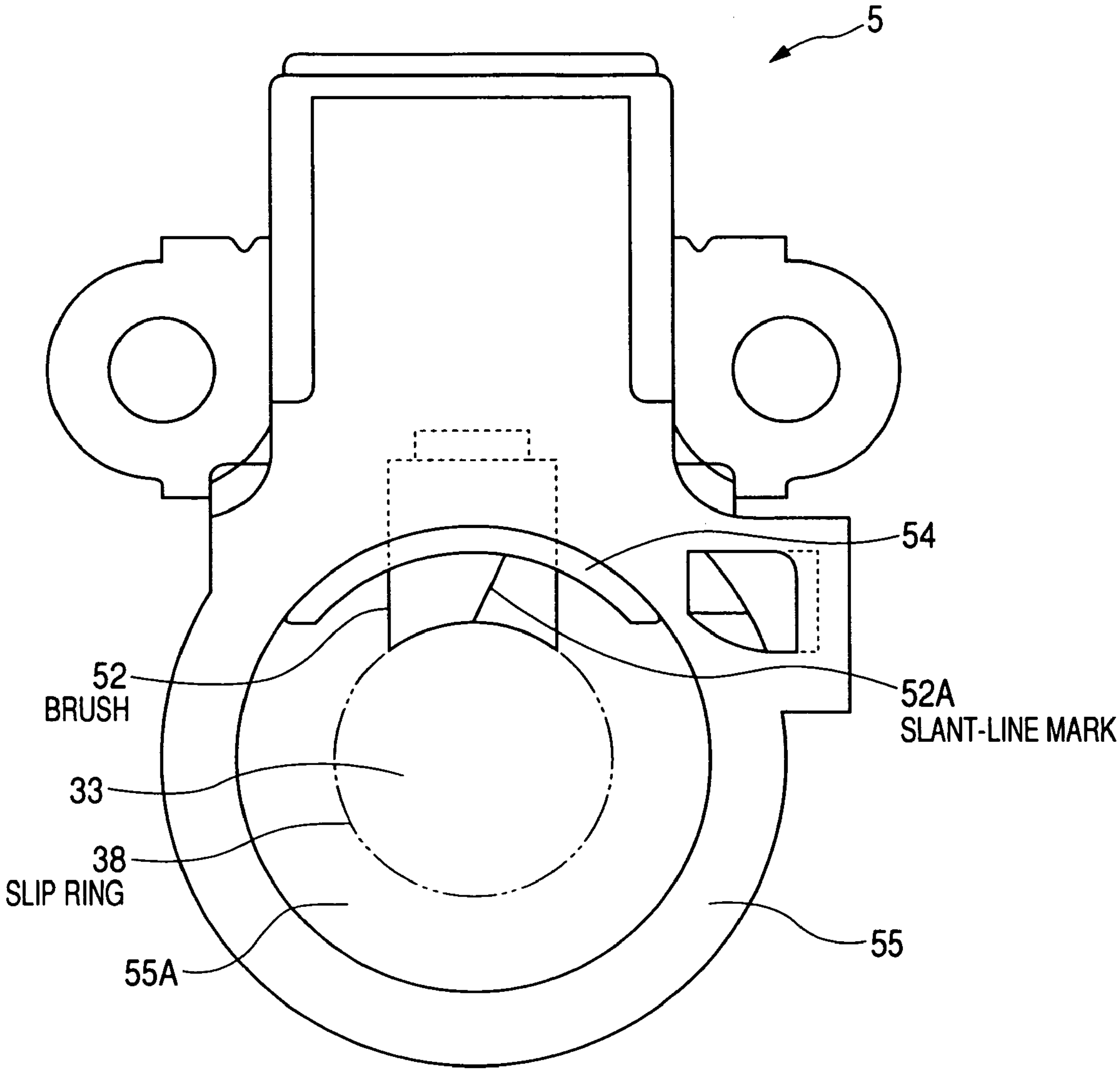
FIG. 4 is a plan view of the brush device having a worn brush that has been worn by a long use according to the embodiment shown in FIG. 1 and FIG. 2.

FIG. 3 is a plan view of the brush device 5 in which a new brush 52 that is not used is incorporated. FIG. 4 is a plan view of the brush device 5 having the worn-state brush 52 that is worn by a long-use.

FIG. 3 and FIG. 4 show the brush holder 54 in which the springs 53 push the brushes 51 and 52 toward the direction of the corresponding slip rings 37 and 38. In particular, FIG. 3 and FIG. 4 mainly shows the brush 52 on which the slant-line mark 52A is formed.

As shown in FIG. 3 and FIG. 4, the slant-line mark 52A is formed on the rear-side surface of the brush 52, perpendicular to the rotary shaft 33, placed at the side of the rear cover 7.

In a concrete example, the slant-line mark 52A is formed not in parallel to and not perpendicular to the pushing-direction designated by the arrow "A" shown in FIG. 3, where the spring 53 push the brush 52 toward the slip ring 38. For example, the slant-line mark 52A is formed by drawing a line on the surface of the brush 52 with paint. Thus, the concept of the present invention can form the slant-line mark 52A on the surface of the brush without changing a physical configuration of the brush device 5 with a minimum design change and working in the manufacturing. The slant-line mark 52A is capable of detecting the use-state or wear-state of the brush 52 incorporated in the brush device 5.

It is possible to form or draw the slant-line mark 52A on at least one of the concave part and the convex part on the surface of the brush 52 only by changing a shaping mold for the brush 52 in the manufacturing step without increasing the number of component parts and manufacturing steps.

As shown in FIG. 3, because the brush 52 of the brush device 5 is not worn because it shows the brush 52 immediately following the initial use of the vehicular alternator 1, the inspector can recognize the slant-line mark 52A, through the penetrating hole 55A formed in the sealing member 55, that is positioned on the surface of the brush 52 near the left side.

On the contrary, because the brush 52 is gradually worn from its end face that is forcedly pushed to and contacted to the corresponding slip ring 38 after a long use of time in the vehicular alternator 1. FIG. 4 shows the brush worn for a long use of time. The inspector can recognize the slant-line mark 52A, which is gradually shifted according to the time passes in use of the brush 52, toward the right side of the surface of the brush 52.

According to the brush device to be incorporated into the vehicular alternator 1 of the embodiment, the position of the slant-line mark 52A is changed, namely, shifted toward the right side in FIG. 3 according to the wear-proceeding of the brush 52 that is pushed to the surface of the slip ring 38 by the spring 53, so that the inspector can recognize and know a detailed surface state (namely, a detailed wear-state) of the brush 52. In particular, the inspector recognizes the use-state or wear-state of the brushes 37 and 38 in the brush device 5 only by disassembling the rear cover 7 from the vehicular alternator 1 without disassembling the brush device 5 from the rectifier device 6.

In addition, it is possible to maintain the sealing state around the slip rings 37 and 38 by the sealing member 55 and also possible to recognize the use-state or wear-state of the brushes in detail through the penetrating hole 55A only by dismantling the rear cover 7 from the vehicular alternator 1 while assembling the sealing member 55 into the brush device 5 at a periodic inspection time.

FIRST EXAMPLE OF MODIFICATION

Figure 5:
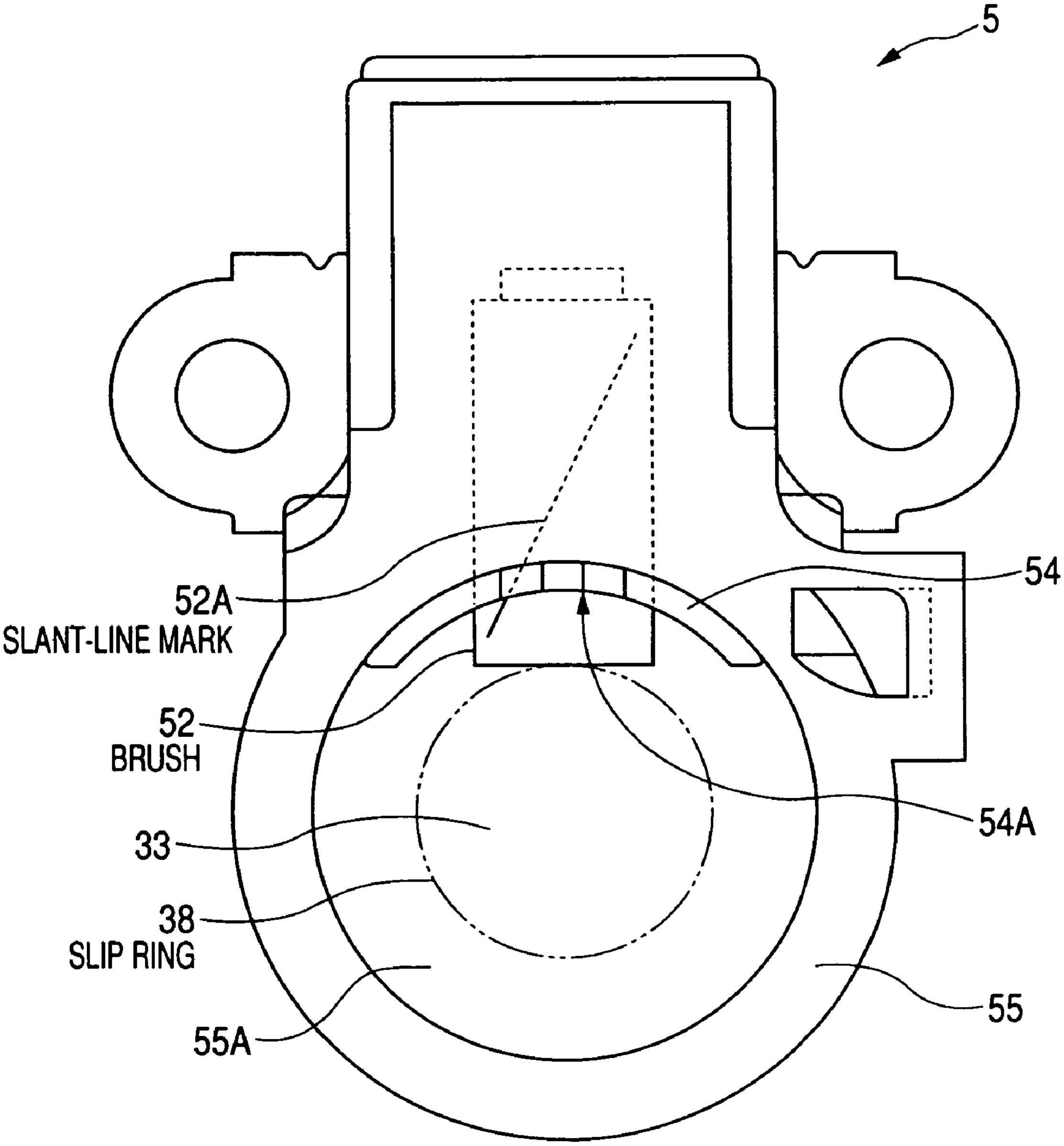
FIG. 5 is a view showing a first modification having another configuration of the brush device of the vehicular alternator according to the embodiment shown in FIG. 1 to FIG. 4.

The concept of the present invention is not limited by the above configuration and applicable to various cases within the scope of the present invention. FIG. 5 is a view showing a first modification having another configuration of the brush device 5 incorporated in the vehicular alternator 1 according to the embodiment shown in FIG. 1 to FIG. 4.

For example, although the slant-line mark 52A is drawn on the surface of the brush 52 of the brush device 5, it is possible to add scale marks 54A on the surface of the brush holder 54 that correspond to the surface of the brush 52 on which the slant-line mark 52A is drawn. The inspector can precisely recognize the position of the slant-line mark 52A that has been shifted according to the wear proceeding of time in use of the brush 52.

The scale marks 54A are formed at corresponding positions within a movable range of the slant-line mark 52A. Like the slant-line mark 52A, it is possible to draw the scale marks 54A by paint, or possible to form at least one of a concave part and a convex part on a part of the surface of the brush 52. The latter case requires the use of a shaping mold of the brush according to the shape of the concave part or the convex part during the manufacturing.

SECOND EXAMPLE OF MODIFICATION

A description will be given of the second example of modification of the brush device 5 of the embodiment according to the present invention.

Figure 6:
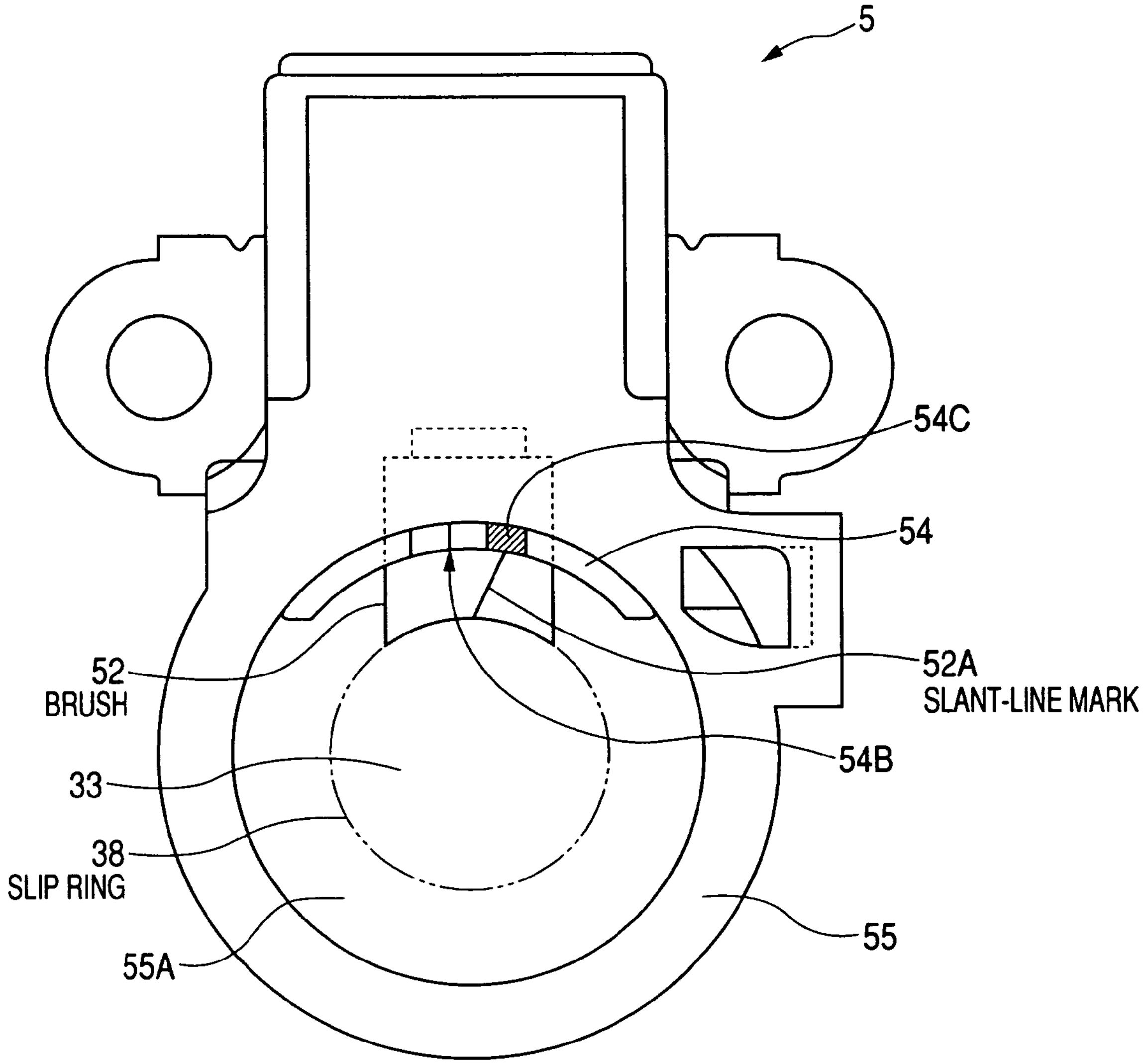
FIG. 6 is a view showing a second modification having another configuration of the brush device of the vehicular alternator according to the embodiment shown in FIG. 1 to FIG. 4.

It is acceptable to change the shape and position of the scale marks 54A formed on the brush holder 54 in order to clearly recognize the serviceability limit position of the brush 52 and the optimum replacement time by the inspector. FIG. 6 is a view showing a second modification having another configuration of the brush device 5 of the vehicular alternator 1 according to the embodiment shown in FIG. 1 to FIG. 4.

As shown in FIG. 6, scale marks 54B are formed on the surface of the scale holder 54, and a replacement time/serviceable limit area 54C is further formed on the brush holder 54. According to the wear proceeding of time and the time elapse in use, the position of the slant-line mark 52A is shifted from the left side toward the right side shown in FIG. 6. It is the time to replace the brush with new brush when the position of the slant-line mark 52A reaches the right side of the replacement time/serviceable limit area 54C. The serviceable limit of the brush 52 is determined when the slant-line mark 52A reaches the right end of the replacement time/serviceable limit area 54C according to the wear proceeding of time. The inspector can preciously recognize the use-state or wear-state of the brushes 52 and 53 of the brush device 5 only by forming the replacement time/serviceable limit area 54C on the part of the scale marks 54B formed on the brush holder 54.

Although the slant-line mark 52A is formed on the surface of the brush 52 in the above embodiment, it is possible to form the slant mark on the surface of the other brush 51 in view of common use.

Although the slant-line mark 52A is formed by a simple line in the above embodiment, it is acceptable to draw the mark with a curved line or to draw a triangle shape on the surface of the brush 52 or brush 51, and to use a part of those marks in the inspection.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A brush device for an electric rotary machine comprising:

a brush electrically contacted to and pushed to a surface of a slip ring mounted on a rotary shaft of a rotor;

a spring pushing the brush toward the slip ring; and a brush holder accommodating the brush and the spring, wherein a mark is formed on a surface of the brush, and the surface of the brush is perpendicular to the rotary shaft of the rotor, and the brush holder has scale marks formed on a surface of the brush holder faced to the surface of the brush on which the mark is formed.

2. The brush device for an electric rotary machine according to claim 1, wherein the mark is a slant-line mark drawn on the surface of the brush by paint and the slant-line mark slants to a vertical line perpendicular to the rotary shaft of the rotor.

3. The brush device for an electric rotary machine according to claim 1, wherein a direction of the mark formed on the surface of the brush is not in parallel to and not perpendicular to a direction of pushing the brush toward the slip ring by the spring.

4. The brush device for an electric rotary machine according to claim 1, wherein the mark is visible and formed on at least one surface of the brush without releasing the pushing force by the spring toward the direction of the slip ring through the brush.

5. The brush device for an electric rotary machine according to claim 3, wherein the mark is visible and formed on at least one surface of the brush without releasing the pushing force by the spring toward the direction of the slip ring through the brush.

6. The brush device for an electric rotary machine according to claim 4, wherein the mark is visually formed on the surface of the brush from outside of the electric rotary machine when a rear cover covering electric components assembled in the electric rotary machine is dismantled from the electric rotary machine.

7. The brush device for an electric rotary machine according to claim 6, further comprises a sealing member placed between the brush holder and the rear cover, wherein the sealing member has a penetrating hole formed at a position opposite to another surface of the sealing member which faces the rotary shaft of the rotor when the sealing member is assembled into the brush holder.

8. The brush device for an electric rotary machine according to claim 1, wherein the mark is drawn on the surface of the brush by paint.

9. The brush device for an electric rotary machine according to claim 1, wherein the mark is at least one of a concave part and a convex part formed on the surface of the brush.

10. The brush device for an electric rotary machine according to claim 1, wherein the scale marks have a shape and an arrangement indicating a serviceability limit time of the brush.

11. The brush device for an electric rotary machine according to claim 10, wherein the scale mark indicating the serviceability limit time of the brush is formed at an extreme end on the brush holder along the direction of the rotary shaft of the rotor.

12. The brush device for an electric rotary machine according to claim 1, wherein the scale marks have a shape and an arrangement indicating one of a replacement time and a serviceability limit time of the brush.

13. The brush device for an electric rotary machine according to claim 12, wherein the scale mark indicating the serviceability limit time of the brush is formed at an extreme end on the brush holder along the direction of the rotary shaft of the rotor.

* * * * *